United States Patent

Kraus et al.

Patent Number: 6,149,298
Date of Patent: Nov. 21, 2000

[54] RADIATION THERMOMETER AND METHOD OF COMPUTING THE TEMPERATURE

[75] Inventors: Bernhard Kraus, Braunfels; Manfred Kaiser, Karben, both of Germany

[73] Assignee: Braun Aktiengesellschaft, Germany

[21] Appl. No.: 09/212,817

[22] Filed: Dec. 16, 1998

[30] Foreign Application Priority Data

Dec. 23, 1997 [DE] Germany .......................... 197 57 447

[51] Int. Cl.$^7$ .................................................. G01K 13/00
[52] U.S. Cl. ........................ 374/133; 374/121; 374/179; 374/124
[58] Field of Search ..................... 374/133, 126

[56] References Cited

U.S. PATENT DOCUMENTS

| | | | |
|---|---|---|---|
| 4,784,149 | 11/1988 | Berman et al. | 128/664 |
| 4,797,840 | 1/1989 | Fraden | 235/383 |
| 4,881,823 | 11/1989 | Tanaka | 374/126 |

FOREIGN PATENT DOCUMENTS

| | | |
|---|---|---|
| 0 337 724 | 10/1989 | European Pat. Off. . |
| 56-119824 | 9/1981 | Japan . |
| 59-26759 A2 | 7/1986 | Japan . |
| 8-015026 | 1/1996 | Japan . |
| 7 811 861 | 5/1980 | Sweden . |

OTHER PUBLICATIONS

Disclosed Anonymously, Correction for Media Absorption of Transmitted Light Intensity in Optical Pyrometry, Research Disclosure, Nov. 1991, No. 331, Emsworth, Great Britian.

Von J. Verch, Auswertung optisch–pyrometrischer Temperaturmessungen/Optik 19, Heft 12, 1962/pp. 640–665.

*Primary Examiner*—G. Bradley Bennett
*Assistant Examiner*—Gail Verbitsky
*Attorney, Agent, or Firm*—Hopgood, Calimafde, Kalil & Judlowe

[57] ABSTRACT

The invention is directed to a method of computing the radiation temperature of a body from the signals of a radiation and an ambient temperature sensor, and further to a radiation thermometer, in particular a clinical radiation thermometer. In the method of the present invention, computation of the temperature is not using the Stefan Boltzmann law, but rather, a polynomial is used, preferably a third-degree polynomial, which is adjusted to the radiation-optical properties of the thermometer in the relevant wavelength range. The reciprocal value of the sensitivity of the radiation sensor is preferably represented as a polynomial as well. In this manner, the computation of a fourth root or divisions which are otherwise customary are avoided, enabling the necessary computations to be also performed, for example, by a 4-bit microprocessor with great speed.

13 Claims, 2 Drawing Sheets

RADIATION THERMOMETER AND METHOD OF COMPUTING THE TEMPERATURE

This invention relates to a method of computing the radiation temperature of a body from the signals of a radiation and an ambient temperature sensor, and further to a radiation thermometer, in particular a clinical radiation thermometer.

Figure 1:
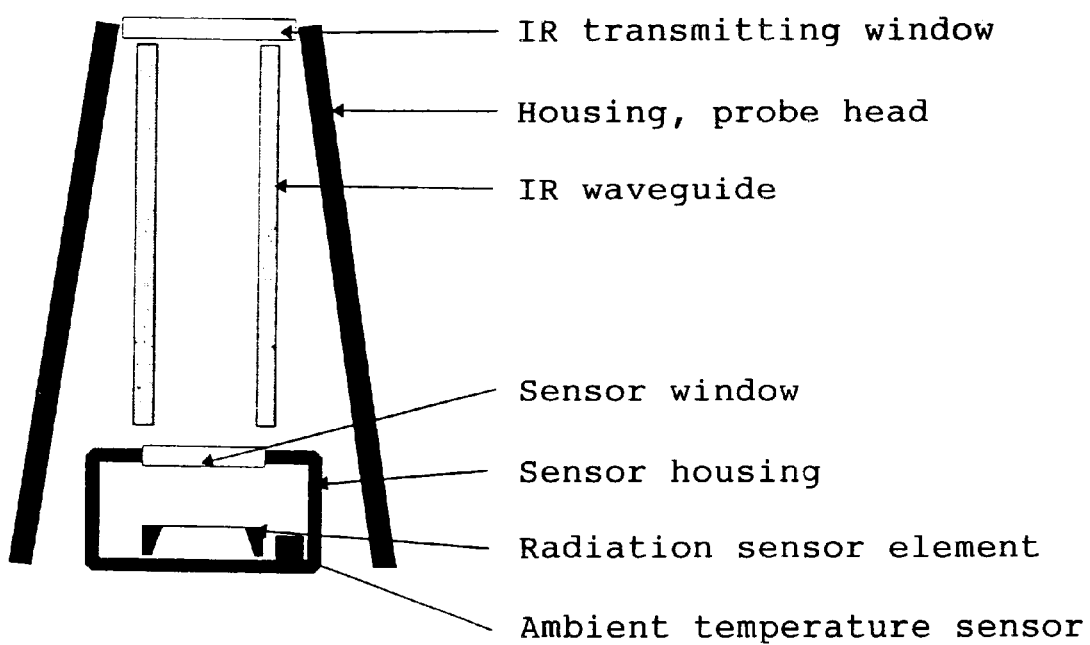
FIG. 1 illustrates a probe head.

By way of example, FIG. 1 illustrates schematically a probe head of a clinical radiation thermometer with a simple infrared optic system. It includes an IR transmitting window which is disposed at the forward end of a housing and from the rear side of which extends an IR waveguide into the interior of the probe head. The clinical radiation thermometer further has a sensor housing accommodating an ambient temperature sensor and a radiation sensor as well as a computing unit not illustrated in FIG. 1. To determine the body temperature, the forward end of this optic system is directed into the ear. In this example, infrared radiation emitted by the tympanic membrane and the ear canal passes through the window, the waveguide and a sensor window, entering the sensor housing where it impinges upon the radiation sensor. The partial temperature increase thereby caused in the sensor produces an electrical output voltage. Because the magnitude of this output voltage depends also on the ambient temperature—or a reference temperature—this temperature is determined by a corresponding ambient temperature sensor. Furthermore, the sensor signal is dependent on the optical properties of the window and the waveguide employed, and of any filters or protective probe covers that may be used.

The spectral radiant intensity absorbed or emitted by a body is known to be given by the Planck radiation law:

$$I(T, \lambda) = h_1 \varepsilon(\lambda) \frac{1}{\lambda^5} \frac{1}{e^{\frac{h_2}{\lambda T}} - 1} \quad (1)$$

where

Figure 2:
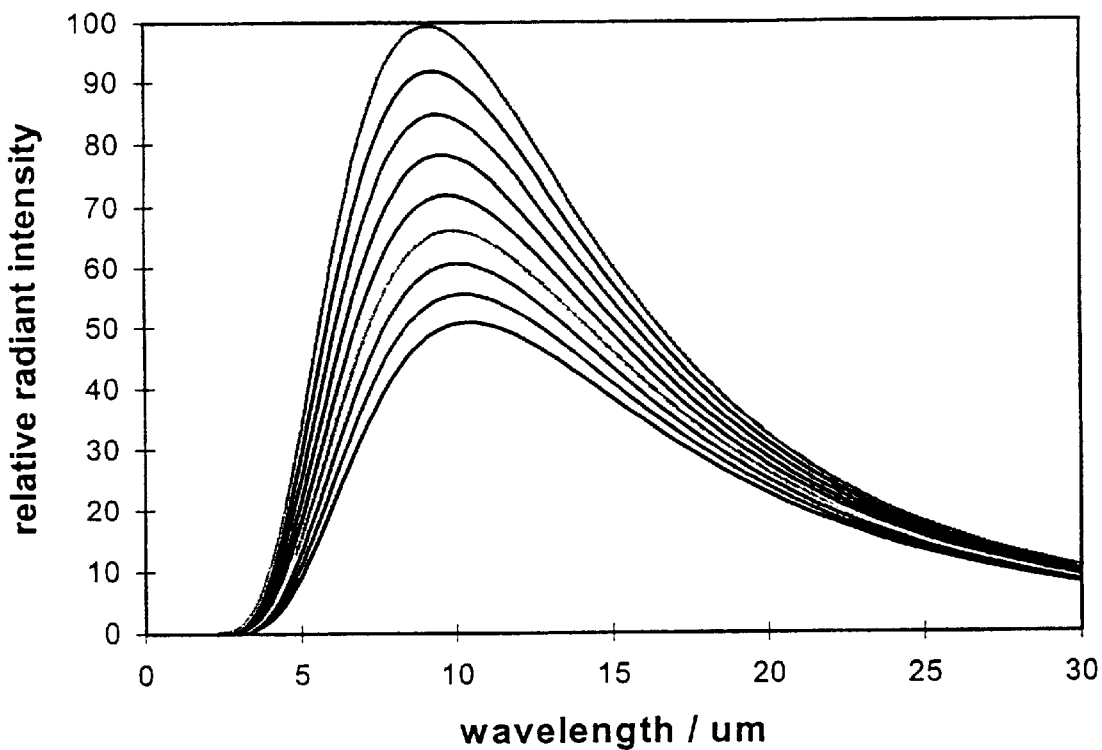
FIG. 2 illustrates the relative radiant intensity of a blackbody for various radiation temperatures as a function of the wavelength.

T absolute temperature $h_1$, $h_2$ constants $\lambda$ wavelength $\varepsilon(\lambda)$ emissivity or degree of absorption of the body For clarity of the illustration, the relative radiant intensity of a blackbody, that is, $\varepsilon(\lambda)=1$, is illustrated in FIG. 2 for various radiation temperatures (5, 10, . . . 45° C.) as a function of the wavelength.

To determine the entire radiant flux absorbed by a radiation sensor, equation (1) is integrated over the entire wavelength range. This takes into account the transmission of the optical components and the degree of absorption of the sensor.

$$L(T) \sim \int_0^\infty \varepsilon(\lambda)\tau(\lambda)s(\lambda) \frac{1}{\lambda^5} \frac{1}{e^{\frac{c_2}{\lambda T}} - 1} d\lambda \quad (2)$$

where $\varepsilon(\lambda)$ emissivity of the radiant body $\tau(\lambda)$ transmission of the optical components $s(\lambda)$ wavelength-dependent component of the sensor sensitivity To solve this integral, ideal conditions are often assumed. In cases of a blackbody ($\varepsilon(\lambda)=1$), ideal optical components ($\tau(\lambda)=1$) and ideal sensor sensitivity ($s(\lambda)=1$), integrating equation (2) results in the Stefan Boltzmann law:

$$L(T) \sim T^4 \quad (3)$$

Figure 3:
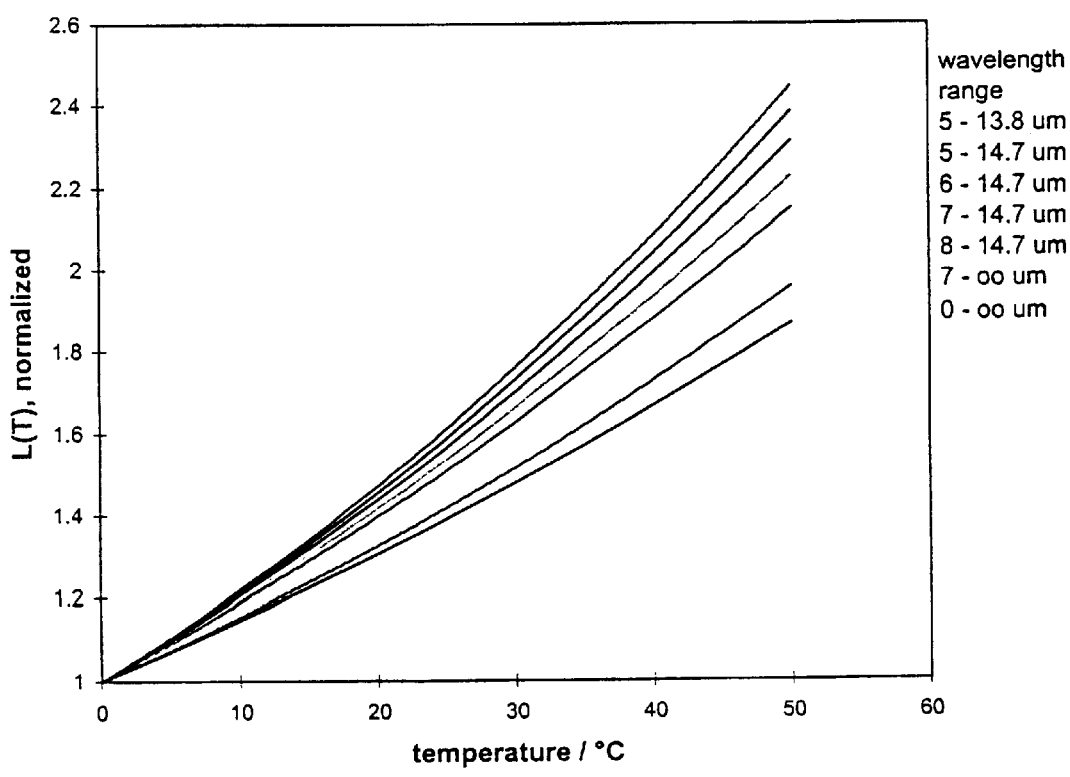
FIG. 3 illustrates as an example for various non-ideal transmissions the integral L(T), normalized to L(T=0° C.)=1, for various wavelength ranges.

In particular where optical filters are used which frequently find application in filtering out undesirable wavelength ranges, the Boltzmann equation is no longer applicable. FIG. 3 illustrates as an example for various non-ideal transmissions the integral L(T), normalized to L(T=0° C.)=1, for various wavelength ranges. In this case, $\varepsilon(\lambda)*\tau(\lambda)*s(\lambda)=1$ for $\lambda_1<\lambda<\lambda_2$, and $\varepsilon(\lambda)*\tau(\lambda)*s(\lambda)=0$ for $\lambda<\lambda_1$ or $\lambda_2<\lambda$, were considered. This corresponds approximately to the use of various optical filters. The wavelength range 0–∞ μm corresponds to the Stefan Boltzmann law $L(T) \sim T^4$.

To determine the output signal of a radiation sensor it is necessary to consider the transmission of the optical components (protective probe covers, windows, waveguides, filters, . . .) and the sensor sensitivity. Furthermore, the emitted radiant flux has to be subtracted from the radiant flux received by the sensor. Thus the sensor signal results as follows:

$$U = S[L_{(T_S)} - L_{(T_U)}] \quad (4)$$

where

S sensitivity of the radiation sensor $T_U$ temperature of the radiation sensor (ambient temperature)

$T_S$ temperature of the measured object

To determine the radiation temperature from the output signal of the radiation sensor, it is necessary to have knowledge of the inverse function T(L) apart from L(T). Equation (4) yields $$L(T_S) = \frac{U}{S} + L(T_U) \quad (5)$$

In the special cases of an ideal blackbody, ideal optical components and ideal sensor sensitivity $\varepsilon(\lambda)=\tau(\lambda)=s(\lambda)=1$, using equation (3) results in $$T_S = \sqrt[4]{\frac{U}{S} + T_U^4} \quad (6)$$

When this equation is used in the non-ideal case (that is, always), corresponding errors will result (see FIG. 3). Therefore, methods of approximation are frequently employed:

a) One possibility of computing the radiation temperature involves the direct use of equation (6). Fraden (U.S. Pat. No. 4,797,840), for example, cites this equation, substituting a polynomial for the temperature-dependent parameter S.

As discussed in the foregoing, this equation can be used only when the optical components approximate the ideal case relatively closely, or when the ambient temperature and radiation temperature ranges are severely limited. Otherwise relatively large temperature errors result. A further disadvantage of this formula is the need to compute the fourth root. Considering that the simple microcomputers utilized in ear thermometers are incapable of performing this computation directly, complex iterative processes are necessary, for example. Simpler, yet less accurate, approximation methods include those operating with the aid of tables or series expansions.

b) To avoid computation of the fourth root in equation (6), formulae may be used in which the ambient temperature and the radiation temperature occur in different powers. Goldberg (U.S. Pat. No. 5,150,969), for example, cites the following equation:

$$T_S = c + \sum_{i=1}^{n} A_i U^i + \sum_{i=1}^{n} B_i T_U^i \qquad (7\text{-}1)$$

$$T_S = k_0 + c + k_1 + G_1 \sum_{i=1}^{n} A_i G_0^i U^i + G_2 \sum_{i=1}^{n} B_i T_u^i \qquad (7\text{-}2)$$

The parameters $c, k_0, k_1, G_0, G_1, G_2, A_i$ and $B_i$ used in this formula have to be determined during calibration (or are set at a constant value). In the simplest case, n is assumed to be equal to 1 in equation (7-1) so that only linear terms remain.

Because of the absence of mixed terms $U^i \cdot T^k$ in these equations, equation (5) and also equation (6) generally cannot be approximated particularly well with this formula. The use of a plurality of parameters changes this only insignificantly, while yet increasing the complexity of particularly calibration substantially because these parameters need to be determined for each thermometer individually.

c) A further method is indicated by O'Hara et al. (U.S. Pat. No. 5,293,877) under the designation "Calibration Mapping". In this method, 13 terms which are each multiplied by a parameter $a_i$ are summed up. In contrast to equations (7-1) and (7-2), this method uses also mixed terms in which both U and Tu occurs. Still further, the temperature of the waveguide is also considered.

The computation of the radiation temperature is relatively complex. Particularly complex is the calibration of the individual thermometers involving determination of the individual parameters.

d) A method claimed to be advantageous specifically in the use of optical filters is proposed by Egawa et al. (EP-A-0 337 724). In this method, the function L(T) is approximated by (see equation (3) above)

$$L(T) = a(T-b)^4 + c \qquad (7\text{-}3)$$

From this the radiation temperature is obtained $$T_S = \sqrt[4]{\frac{U}{S} + (T_U - b)^4} + b \qquad (7\text{-}4)$$

Parameter b which, by comparison with equation (6), has been added to this formula, is adjusted in dependence upon the optical filter employed.

While the parameter enables the accuracy of computation to be enhanced, this enhancement is limited because of the use of the generally inaccurate equation (6) and the correction by means of only one parameter. In addition, the need to compute the fourth root remains.

It is an object of the present invention to provide a method for the accurate and simple computation of radiation temperatures, which method is also capable of taking into account the optical properties of a radiation thermometer in the relevant wavelength range.

In the method of the present invention, the temperature is not computed using equation (3), but rather, a polynomial, preferably a third-degree polynomial, is used, whose parameters are adjusted to the radiation-optical properties of the thermometer in the relevant wavelength range. The reciprocal value of the sensitivity of the radiation sensor in equation (5) is preferably represented as a polynomial as well. In this manner, the computation of a fourth root or divisions are avoided, enabling the necessary computations to be also performed, for example, by a 4-bit microprocessor with great speed. Computation can be speeded up further by the use of "look-up tables" for computing the polynomials.

In the method of the present invention, the computation of the temperature of the heat radiating body comprises the following steps:

1. Determination of the ambient temperature $T_U$:

The dependence on temperature of the measured value of conventional temperature sensors can be usually described relatively accurately by simple equations using, for example, $$R = R_0[1 + \alpha(T_U - T_0) + \beta(T_U - T_0)]^2 \qquad (8)$$

The parameters $R_0$, $\alpha$ and $\beta$ are supplied by the sensor manufacturer or else have to be determined during calibration of the radiation thermometers. The possibility also exists to assume a constant value for $\beta$ and possibly also for $\alpha$. In the method of the present invention, the ambient temperature $T_U$ is preferably computed using the following equation:

$$T_U = \sum_{i=0}^{k} a_i R^i \qquad (9)$$

where R is the ambient temperature sensor signal converted into a digital value. Using a third-degree polynomial, accuracies of 1/1000° C. are obtainable with conventional sensors. The polynomial coefficients a are determined during calibration.

2. Determination of an intermediate function L at the ambient temperature $T_U$:

Substituting equation (3), the invention provides for computation of an intermediate function which is preferably a third-degree polynomial:

$$L(T_U) = b_3 T_U^3 + b_2 T_U^2 + b_1 T_U + b_0 \qquad (10)$$

The polynomial coefficients $b_i$ are determined during calibration such that L(T) approximates the integral illustrated in FIG. 3 as closely as possible in the relevant temperature range (for a clinical thermometer this range is, for example 0<T<50° C.).

3. Consideration of the temperature dependence of the sensitivity of the radiation sensor:

In order to make allowance for a temperature dependence, if any, of the radiation sensor's sensitivity and avoid the division by S, in a preferred aspect of the method of the present invention, substitution for S in equation (5) yields $$\frac{1}{S} = \sum_{i=0}^{l} d_i (T_U - T_0)^i \qquad (11)$$

The polynomial coefficients $d_i$ are determined during calibration. For conventional radiation sensors consideration of the temperature dependence by a first-degree polynomial is sufficient. If the temperature dependence is known, the parameters $d_i$ may be used as constants. For calibration of the radiation sensor's sensitivity, it is then only necessary to determine $d_0$.

4. Computation of the radiation temperature $T_S$:

Using equation (5) and the above intermediate function L, the invention provides for the body's radiation temperature $T_S$ to be computed as follows:

$$L(T_S) = U \sum_{i=0}^{l} d_i(T_U - T_0)^i + \sum_{i=0}^{m} b_i T_U^i \quad (12)$$

Not only the intermediate function L(T) but also its inverse function T(L) may be represented as a polynomial, for example, as a third-degree polynomial:

$$T_S = \sum_{i=0}^{m} c_i L^i \quad (13)$$

where

L intermediate function
U radiation sensor signal, converted into a digital value
$T_U$ absolute ambient temperature in K
$T_S$ temperature of the measured object in °C.
$T_0$ reference temperature
$b_i$, $c_i$, $d_i$ polynomial coefficients Depending only on the optical properties $\epsilon(\lambda)$, $\tau(\lambda)$ and $s(\lambda)$, the parameters $b_i$ and $c_i$ can be computed when the optical properties are known. Alternatively, an experimental determination is also possible. Also in cases where cut-off or band filters are utilized, third-degree polynomials are usually sufficient. Approximating the integrals illustrated in FIG. 3 by third-degree polynomials, errors in the 2/1000° C. range result.

The computation method described above (equations (10) to (13)) has the following advantages:

The radiation temperature can be computed to any desired accuracy depending on the polynomial degree, including in particular cases where optical filters are used for filtering out undesirable wavelength ranges or in the presence of selective sensor sensitivities.

The calibration of a thermometer using the computation method described has an effect on very few parameters only. For calibrating the sensitivity of the radiation sensor, for example, only one parameter needs to be changed.

In cases where other optical filters or other sensors are used, only few parameters need to be changed, the computation method remaining the same.

We claim:

1. A method of computing the temperature of a mammal from the signals of a radiation and an ambient temperature sensor, particularly for use in a radiation thermometer, in particular a clinical radiation thermometer, comprising the steps of:

determining the ambient temperature ($T_U$) using a signal (R) supplied by the ambient temperature sensor;

computing an intermediate function ($T_U$) at the ambient temperature $T_U$ determined;

computing the intermediate function (L($T_S$)) for the body temperature ($T_S$) using the signal (U) supplied from the radiation sensor and the intermediate function (L($T_U$)) at the computed ambient temperature ($T_U$);

computing the mammal temperature ($T_S$) using an inverse function of the intermediate function (L($T_S$)), wherein an intermediate function (L) and its inverse functions are polynomials.

2. The method as claimed in claim 1, characterized in that the intermediate function (L) contains parameters adjusted to the optical properties of the radiation thermometer.

3. The method as claimed in claim 1, characterized in that the intermediate function (L) and/or its inverse function are third-degree polynomials.

4. The method as claimed in claim 1, characterized in that the step of computing the radiation temperature ($T_S$) includes operating on a polynomial expression for a reciprocal value of a temperature-dependent sensitivity of the radiation sensor.

5. The method as claimed in claim 1, characterized in that the step of determining the ambient temperature ($T_U$) comprises computing on an operand polynomial that includes both the signal (R) and a temperature-dependent parameters of the ambient temperature sensor utilized.

6. A clinical radiation thermometer, thermometer for use on a mammal, which thermometer comprises an ambient temperature sensor and a radiation sensor as well as a computing unit for determining the temperature ($T_S$) of the heat-radiating mammal, wherein said computing unit performs the steps of:

determining a ambient temperature ($T_U$) using a signal (R) supplied by the ambient temperature sensor;

computing an intermediate function (L($T_U$)) at an ambient temperature $T_U$ determined;

computing the intermediate function (L($T_S$)) for the mammal temperature ($T_S$) using the signal (U) supplied from the radiation sensor and the intermediate function (L($T_U$)) at the computed ambient temperature ($T_U$);

computing the mammal temperature ($T_S$) using an inverse function of the intermediate function (L($T_S$)), wherein the intermediate function (L) and its inverse functions are polynomials.

7. The method as claimed in claim 2, characterized in that the intermediate function (L) and/or its inverse function are third-degree polynomials.

8. The method as claimed in claim 2, characterized in that the computation of the radiation temperature ($T_S$) operates on a reciprocal value of the temperature-dependent sensitivity of the radiation sensor expressed as a polynomial.

9. The method as claimed in claim 3, characterized in that the computing the radiation temperature ($T_S$) operates on a reciprocal value of a temperature-dependent sensitivity of the radiation sensor expressed as a polynomial.

10. The method as claimed in claim 1, characterized in that determining the ambient temperature ($T_U$) includes as an operand a polynomial expression including the signal (R) and a temperature-dependent parameters of the ambient temperature sensor.

11. The method as claimed in claim 2, characterized in that determining the ambient temperature ($T_U$) includes as an operand a polynomial expression in which the signal (R) and a temperature-dependent parameters of the ambient temperature sensor utilized.

12. The method as claimed in claim 3, characterized in that determining the ambient temperature ($T_U$) includes as an operand a polynomial expression in which the signal (R) and a temperature-dependent parameters of the ambient temperature sensor utilized.

13. The method as claimed in claim 4, characterized in that determining the ambient temperature ($T_U$) includes as an operand a polynomial expression in which the signal (R) and a temperature-dependent parameters of the ambient temperature sensor utilized.

* * * * *